March 6, 1962  J. D. BENNETT  3,023,615
DYNAMOMETER

Filed June 10, 1960

INVENTOR.
JOHN D. BENNETT
BY

ATTORNEYS

March 6, 1962   J. D. BENNETT   3,023,615
DYNAMOMETER

Filed June 10, 1960   4 Sheets-Sheet 2

INVENTOR.
JOHN D. BENNETT
BY
ATTORNEYS

March 6, 1962  J. D. BENNETT  3,023,615
DYNAMOMETER

Filed June 10, 1960  4 Sheets-Sheet 3

INVENTOR.
JOHN D. BENNETT
BY
ATTORNEYS

March 6, 1962 J. D. BENNETT 3,023,615
DYNAMOMETER
Filed June 10, 1960 4 Sheets-Sheet 4

INVENTOR.
JOHN D. BENNETT
BY
ATTORNEYS

United States Patent Office 3,023,615
Patented Mar. 6, 1962

3,023,615
DYNAMOMETER
John D. Bennett, Richardson, Tex., assignor to Sun Oil Company, Philadelphia, Pa., a corporation of New Jersey
Filed June 10, 1960, Ser. No. 35,171
11 Claims. (Cl. 73—143)

This invention relates to dynamometers, and more particularly to a simply constructed dynamometer for use in measuring the load characteristics of oil well pumps.

In the pumping of oil wells there is generally employed a walking beam to which is connected a "polish rod" for reciprocating a string of "sucker rods" and a piston within the bore hole. It is important that such a pump performs satisfactorily and in order to provide an indication of the load characteristics thereof various devices have been developed. By observing such load characteristics it may be determined that various parts must be serviced or that, due to a change in conditions in the well, the force transmitted by the string is too great. In the latter case it obviously is important to detect such conditions early if an expensive and time consuming break-down is to be prevented.

One common method of providing an indication of pump operation is to measure and record the force exerted through the "polish rod." In U.S. Patent 2,063,169 to Kemler, dated December 8, 1936, and U.S. Patent 2,659,233 to Fagg et al., dated November 17, 1953, typical instruments for this purpose are disclosed which employ bifurcated rings as deformable members. The ring is connected between the polish rod and the walking beam or the like, the pumping load being thereby transmitted entirely through the ring. The ring is arranged so as to take the full working stress along one diameter and the strain of the ring is detected and recorded by various means. Such instruments are fairly accurate and are satisfactory for initially setting up operation of the pump, but their major drawback is that they are necessarily extremely costly due to the minute strains which must be measured. Furthermore, the attachment of such an instrument to the pump is in itself an involved operation. It is, of course, desirable to make periodic checks on the many pumps in continuous operation in the oil field after they have been set up initially. Instruments presently used, such as of the aforedescribed type, are too expensive, however, to be installed permanently or semi-permanently on the pumps and, due to the difficulty in putting an instrument on the pump and taking it off, periodic checks are not feasible.

Once a well has been completed and a pump put in continuous operation, great accuracy in measuring pump work becomes somewhat less important. There has been a need for a fairly accurate instrument which would cost a very small fraction of what conventional instruments cost, and which could be placed on a pump permanently for quick periodic readings. When the pump is initially put into operation one of the more accurate and expensive instruments may be used to obtain an indicator card or work diagram which may serve as a standard for operation of that pump in the future. Readings obtained thereafter from a relatively simple instrument installed on the pump may be compared with what is considered typical according to the original measurement.

Accordingly, it is the main object of the invention to provide a very simple device which may be installed on a pump permanently if desired, and which may be easily read to provide an indication of the pump-load characteristics. In accordance with one embodiment of the invention disclosed hereafter, the deflection of cables connecting the polish rod to the walking beam, which deflection is directly proportional to the load on the polish rod, is considerably magnified and measured in a simple manner as an indication of such loads. Briefly, this is effected by means of a pulley or spool having at least two different diameters and wires, for example, passing around such diameters and thence, respectively, to the aforementioned cables. Deflection of the loaded cables, which are spanned by the wires passing to the spool, is magnified in the movement of the spool bodily. The more detailed operation will be more clearly presented hereafter.

The invention is further applicable to the determination of pump load characteristics by magnifying the strain of the walking beam, for example. By this mode of operation, or by utilizing cable deflection, the invention can be employed to trace a closed pencil diagram on a chart or card which may be compared with a standard previously established through use of the more expensive and accurate instruments previously discussed.

Further objects and advantages will become more apparent from the following description read in conjunction with the accompanying drawings, in which.

Figure 1:
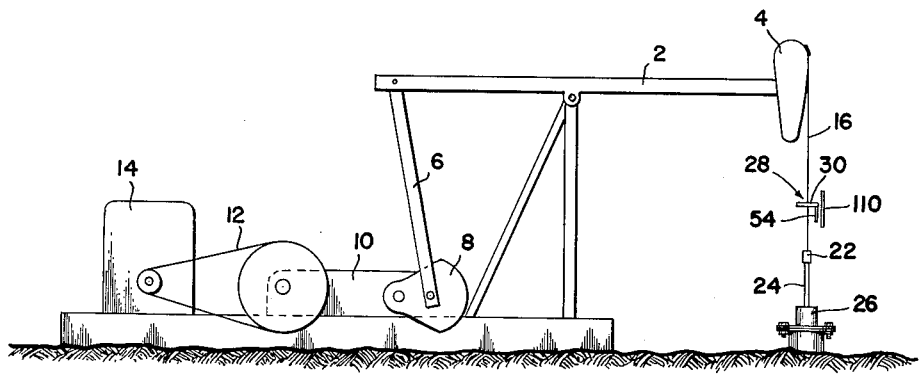
FIGURE 1 is a schematic view of the invention installed on a walking beam pump.
Figure 2:
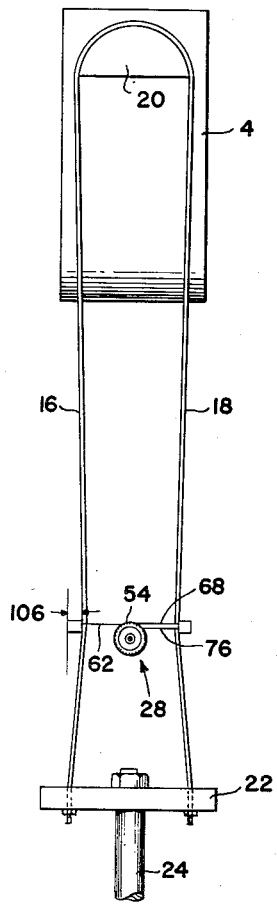
FIGURE 2 is a right-end view of the equipment shown in FIGURE 1.

Referring to FIGURES 1 and 2, the walking beam 2 having the usual head 4, is driven from a throw 8 which in turn is driven through a gear reduction box 10 and a belt drive 12 from a suitable engine 14. The legs or ends 16 and 18 of a steel cable are anchored over a lug 20 on head 4 and are secured to a cross-rod 22 in which is mounted the polish rod 24. As shown in FIGURE 1 the polish rod 24 passes through a packing box 26 and thence to the sucker rods (not shown).

The main subject of the invention is indicated at 28 and for a more detailed description thereof reference will be made particularly to FIGURES 3 and 4. A pair of bars 30 and 32 are provided outside the cables 16 and 18 and for the reception thereof the bars are provided with recesses 34 and 36. U-bolts 38 and 40 securely clamp the cable legs 16 and 18 in the recesses 34 and 36, respectively. Bars 30 and 32 are connected by a link 42 which is rigidly connected to bar 32 by a pair of screws or bolts 44 and pivotally connected to bar 30 by a removable pin 46, additional holes 48 being provided in the link 42 for adjustment of bar 30 along the length thereof. It will be noted that extra sets of holes 50 and 52 and additional recesses 34' and 36' are provided to allow for adjustment of the cables and U-bolts 38 and 40 toward and away from the link 42.

Figures 3, 4:
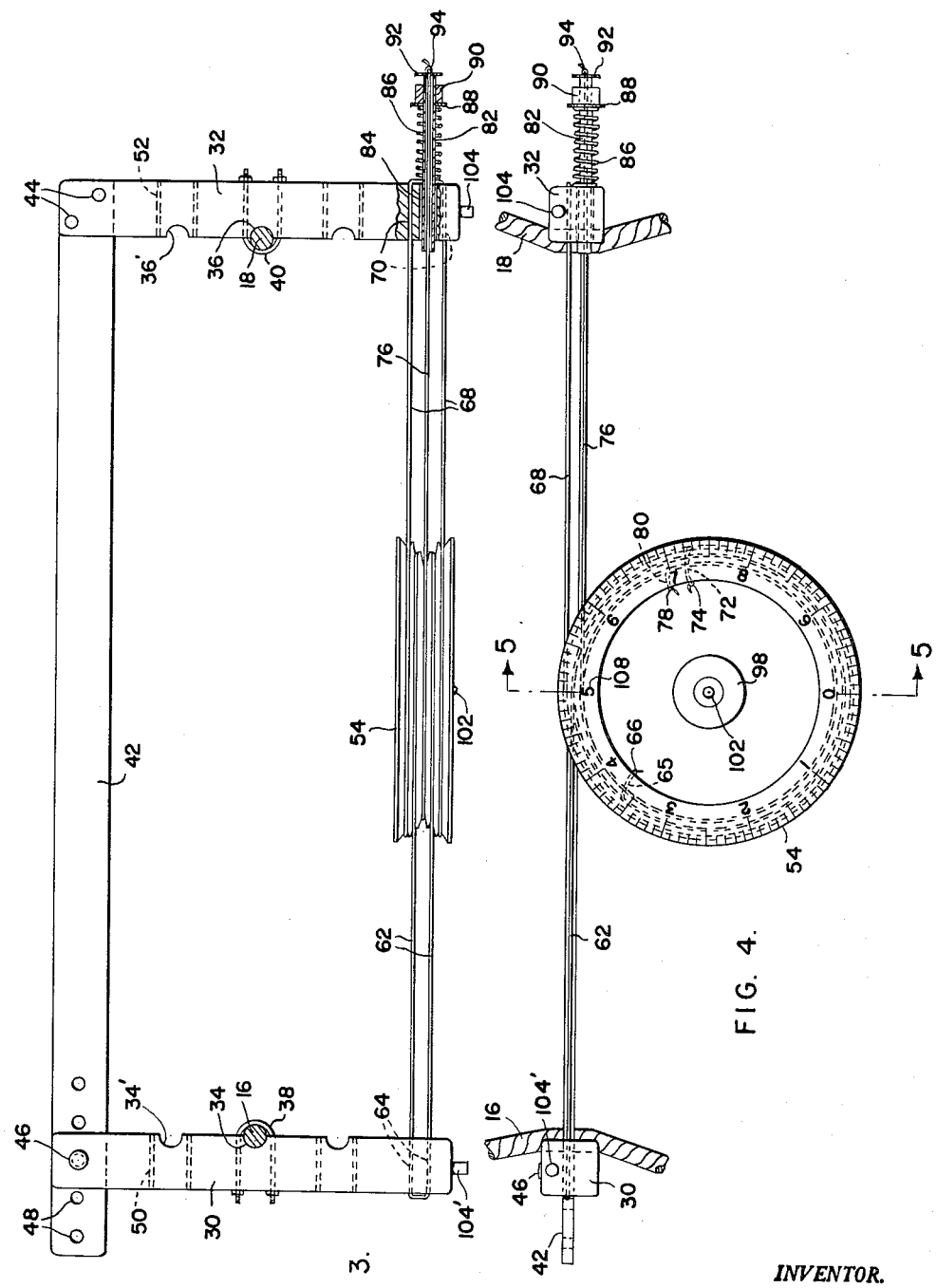
FIGURE 3 is a more detailed plan view of the main subject matter of the invention.
FIGURE 4 is an elevation of the device shown in FIGURE 3.
Figure 5:
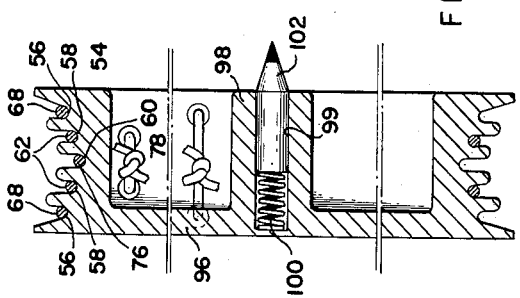
FIGURE 5 is an axial section of the spool taken on line 5—5 in FIGURE 4.

Particularly in FIGURE 4 there is shown a spool 54 and from the cross-section thereof shown in FIGURE 5 it will be seen that this spool has five peripheral grooves therein of three different diameters. A pair of peripheral grooves 56, having the greatest diameter taken at the bottoms of the grooves, are provided at the outsides of spool 54. A second pair of peripheral grooves 58 are next provided, each having a diameter less than the diameter of grooves 56. Lastly, at the central portion of spool 54 there is provided a single peripheral groove 60 having a diameter less than the diameters of grooves 56 and 58.

A strong but flexible cable or wire 62, preferably of stainless steel or the like, is anchored to bar 30 by passing through a pair of drilled passages 64 therein. The free ends of wire 62 are passed around a considerable portion of the circumference of grooves 58 and then through openings 65 in spool 54, at which point they are tied or otherwise fastened as in a knot 66. A second cable or wire 68 is anchored to bar 32 by passing through a pair of drilled passages 70. The free ends of wire 68 are passed around a considerable portion of the circumference of grooves 56 and then through openings 72, at which point they are knotted as indicated at 74. The third wire 76 has one end knotted at 78, passing through an opening 80 in spool 54 and thence around the major portion of the inner groove 60. Wires 68 and 76 likewise are strong and flexible and preferably formed of stainless steel or the like.

Wire 76 is anchored to bar 32 in a manner different from wire 68. A tube 82 is reciprocably received by a bore 84 in bar 32. A compressed coil spring 86, concentric about tube 82, and bearing on the bar 32, acts outwardly upon a washer 88 backed by a nut 90 threaded on the end of tube 82, which thereby is resiliently urged in a direction to the right in FIGURES 3 and 4. Wire 76 is threaded through the center of tube 82 and through a washer 92, against which it is knotted as indicated at 94.

Referring to FIGURE 5, the back side of spool 54 is formed by a continuous wall 96 having protruding therefrom an annular flange 98 in which a bore 99 is adapted to receive a coil spring 100 and pencil 102. The front-end of bars 32 and 30 are provided with pins 104 and 104', respectively, the purposes of which will be discussed more fully hereafter.

It will be evident that the force required to produce a given deflection (e.g. 106 in FIGURE 2) of a cable is a function of the force transmitted by the cable. Thus, if a spring were tensioned between the two cable ends 16 and 18, the variations in deflection of each of the cable ends would serve as an indication of the varying load characteristics of the pump. As will appear hereafter, the dynamometer according to the invention magnifies such variations in cable deflection so that they may be read directly.

When the dynamometer is mounted on the pump as shown in the drawings the forces tending to deflect cable ends 16 and 18 are distributed evenly between one leg represented by the link 42 and another leg represented by wires 62, 68, and 76, spool 54 and spring 86. (This is because cables 16 and 18 are positioned equidistant from the aforementioned legs.) Assuming for the moment that the wire 76 and spring 86 are not provided, upon the ascent of the polish rod, the cable 16 and 18 ends then being heavily loaded, spool 54 would be permitted to move freely and without resistance to the left in FIGURES 3 and 4 until cable ends 16 and 18 were undeflected. However, free movement of spool 54 is resisted by spring 86. It will be noted that leftward movement of the spool results in its paying out, from the circumference of outer groove 56, an increment of wire 68, but for any given amount of rotation of the spool the increment of wire 76 payed out from the smaller diameter groove 60 will be less than that of wire 68. Accordingly, movement of spool 54 to the left must be accompanied by compression of spring 86 to make up for the difference in increments of wires 68 and 76 unrolled from spool 54 for any given rotation thereof. Upon the imposition of a given increased load upon the cable ends 16 and 18, the deflection (106) thereof will be lessened by an extent determined by the characteristics of spring 86, and spool 54 will move to the left (FIGURE 4) by a distance which is indicative of this change in deflection.

In operation, as the polish rod 24 reciprocates and the load on cable ends 16 and 18 varies between a maximum and minimum, spool 54 will move back and forth between the right and left in FIGURES 3 and 4 by amounts directly indicative of load characteristics exerted through the cables. The maximum force will be indicated by the extent of movement of spool 54 to the left and the minimum force will be indicated by the extent of movement to the right. The reading may be taken in either of two ways. First, it being noted that wheel 54 has a dial face carrying reference numerals as indicated for example at 108, the numerals appearing at the twelve o'clock position at the limits of right and left movement may be merely observed and a notation thereof taken. Thus it can be determined over a period of time whether there are changes taking place either in the maximum or minimum forces transmitted through the polish rod during a pumping reciprocation. Secondly, a conventional clipboard having apertures in its two upper corners adapted to be received by the previously mentioned pins 104 and 104' may be used. The clipboard, with a paper or chart thereon, thus can be mounted in front of the spool 54, as illustrated at 110 in FIGURE 1, so that the pencil 102 produces a line indicative of its motion. It should be understood that one of the apertures provided in the clipboard should be elongate transversely in order to permit uninhibited pivoting of bar 30 about pin 46 in accordance with variation of forces in cable ends 16 and 18.

Figure 6:
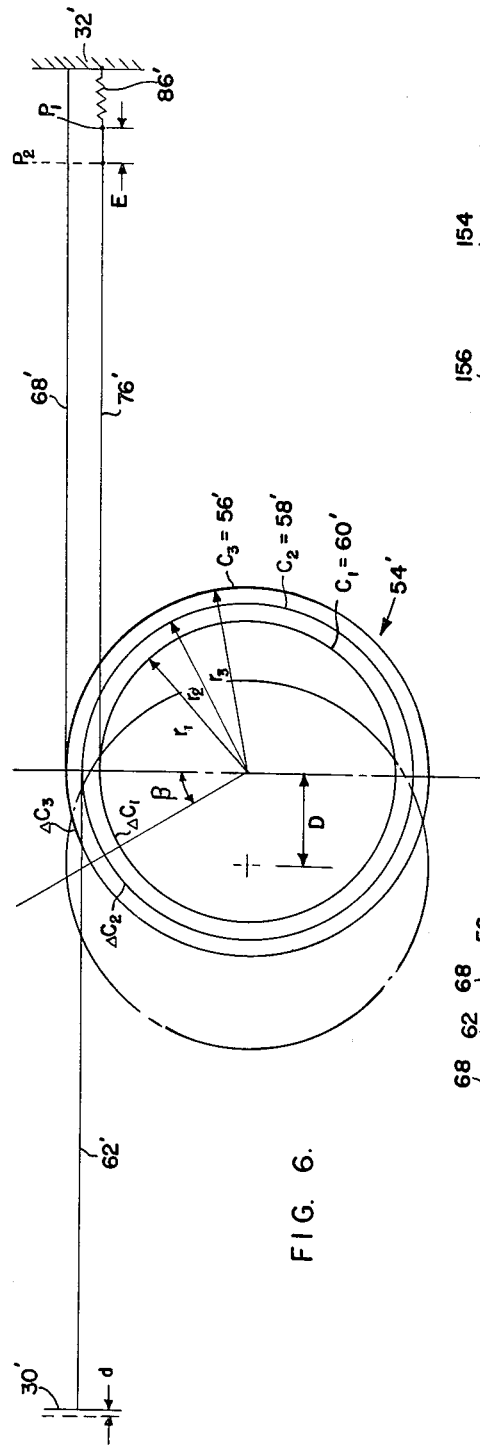
FIGURE 6 is a diagram illustrating the mathematical relationships involved in operation of the invention.

Reference will now be made to FIGURE 6 for further explanation of the underlying principles of the invention. As a polish rod reciprocates during pumping, the load characteristics of the pump will be translated into oscillation of bar 30 about pin 46. For any given increase in load the movement at the end of bar 30 (i.e. the lower end of bar 30 in FIGURE 3) will be represented by a deflection $d$ as shown in FIGURE 6. FIGURE 6 is not drawn to scale but is merely a schematic diagram in which the major elements shown in FIGURES 3 and 4 have been identified by corresponding primed (') numbers. Thus in FIGURE 6 bar 30 is represented by 30' and its deflection upon an increment of load increase is represented by $d$. Since a deflection $d$ normally would not be great it would not be adequate as a fairly accurate reading of the load characteristic. It is desired, therefore, to greatly magnify this deflection $d$ by translation into movement of spool 54 across the front of the apparatus. This magnification is represented by the distance $D$ which spool 54, indicated as 54' would move for a given deflection $d$ of bar 30. Wire 62 is represented by 62' and passes around circumference $C_2$ which corresponds to groove 58 and has a radius $r_2$. Wire 68 similarly is represented at 68' and passes around circumference $C_3$ corresponding to groove 56 and having radius $r_3$. Wire 76 is represented at 76' and passes around inner circumference $C_1$ corresponding to groove 60 and having radius $r_1$. It will be noted that spring 86 is represented by 86'. The reference E is the distance between two points $P_1$ and $P_2$ along wire 76', and represents the compression of spring 86 required for movement of spool 54 through a distance $D$ in response to a deflection $d$ of bar 30. The circumferential increments $\Delta C_1$, $\Delta C_2$ and $\Delta C_3$, represent arcs of the angle beta during movement through a distance D.

The mathematical relationships which follow control the extent of magnification of the deflection $d$:

(a) $D = \Delta C_3 = d + \Delta C_2$ (b) $\Delta C_2 = \Delta C_3 \times \dfrac{r_2}{r_3}$ (c) Therefore, $D = d + \Delta C_3 \times \dfrac{r_2}{r_3}$ (d) Since $\Delta C_3 = D$ Then $D = \dfrac{d}{1 - \dfrac{r_2}{r_3}}$ Assuming for the purpose of illustration that circumference $C_2$ equals 9½ inches and circumference $C_3$ equals 10 inches. For a deflection $d$ of ½ inch spool 54 would move a distance D of 10 inches, representing a 20 to 1 multiplication.

The distance E that is the required compression of spring 86, may be determined from the following equations:

(e) $E = D - \Delta C_1$ (f) $\Delta C_1 = \Delta C_3 \times \dfrac{r_1}{r_3} = D \times \dfrac{r_1}{r_3}$ (g) $E = D - D \times \dfrac{r_1}{r_3} = D\left(1 - \dfrac{r_1}{r_3}\right)$ Assuming, consistent with the above illustration, that the circumference $C_1$ equals 9 inches then, for a deflection $d$ of ½ inch, the spring displacement E would be one inch, or a two to one multiplication of deflection $d$.

From consideration of the mathematical relationships set forth above one skilled in the art can easily select a spring which will perform satisfactorily under any particular given set of operating conditions. The multiplication of deflection $d$ may be increased or decreased by adjustment of cables 16 in the additionally provided sets of recesses 34' and 36'. Large adjustments in the tensioning of spring 86 in its initial position are effected by adjustment of bar 30 along link 42 to any one of the provided holes 48 in the link. Finer adjustments are effected by turning of nut 90 on tube 82.

Figures 8, 9:
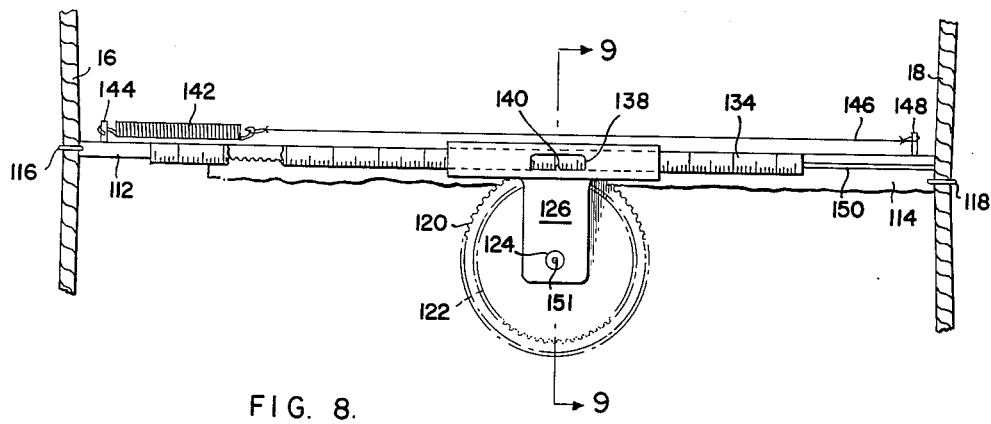
FIGURE 8 illustrates a modification of the invention which employs rack and gear elements.
FIGURE 9 is a section taken on line 9—9 of FIGURE 8.

Although according to the above description the restoration of cable ends 16 and 18 to an undeflected position is resisted by spring 86, as will be more apparent hereafter in connection with FIGURES 8 and 9, a spring may be merely connected either directly across the cables 16 and 18 or, for example, across the bars 30 and 32. Thus it is contemplated that only the wires 62 and 68 could be used, with independent spring means weighing the deflection forces.

Referring to an alternative embodiment of the invention illustrated in FIGURES 8 and 9, a rack and gear arrangement may be employed as an alternative to the spool 54. A pair of rack members 112 and 114 are each connected at one end to cable ends 16 and 18 by clamps 116 and 118, respectively. Meshing with racks 112 and 114 are a pair of gears 120 and 122, respectively, which are joined by screws 121. The gears 120 and 122 are rotatably mounted by a spindle 124 which is supported in the depending legs 126 of a slide member 128. Rack 114 has secured thereto by countersunk screws 132 a rail 130 which is slidably received by member 128. Similarly, rack 112 has a rail 134, fastened by screws 136, slidably received in member 128. The front face of rail 134 carries calibrated indicia which may be viewed through an opening 138 in member 128. A pointer 140 is provided on member 128 for aid in reading the designations on the scale of rail 134. A mating tongue and groove structure is provided between racks 112 and 114 as indicated at 150. Racks 112 and 114 are urged toward each other along their lengths by means of a spring 142 anchored at one end to a pin 144 provided on rack 112, and at its other end to a cable 146 connected to a pin 148 on rack 114.

In the operation of the aforedescribed modification, straightening of cable ends 16 and 18 is resisted by spring 142 and, for any given load, the deflection is determined by attainment of equilibrium between the spring elongation and the load. During reciprocation of polish rod 24 member 128 will reciprocate back and forth along scale 134 in accordance with changes in the load characteristics. The limit of movement to the right and left can be read from scale 134 and, by comparison with readings previously taken when the pump was first set up, it can be determined whether the pump is operating satisfactorily. If desired, a pencil, crayon or the like 151 can be provided in the spindle 124 in the same manner as previously described with reference to FIGURE 5. In such case a clipboard may be positioned or held along the path of movement of pencil 151 to produce a visual record. The operating principles of the modification shown in FIGURES 8 and 9 are identical with those outlined in connection with FIGURE 6 and, therefore, need not be further described.

Figure 7:
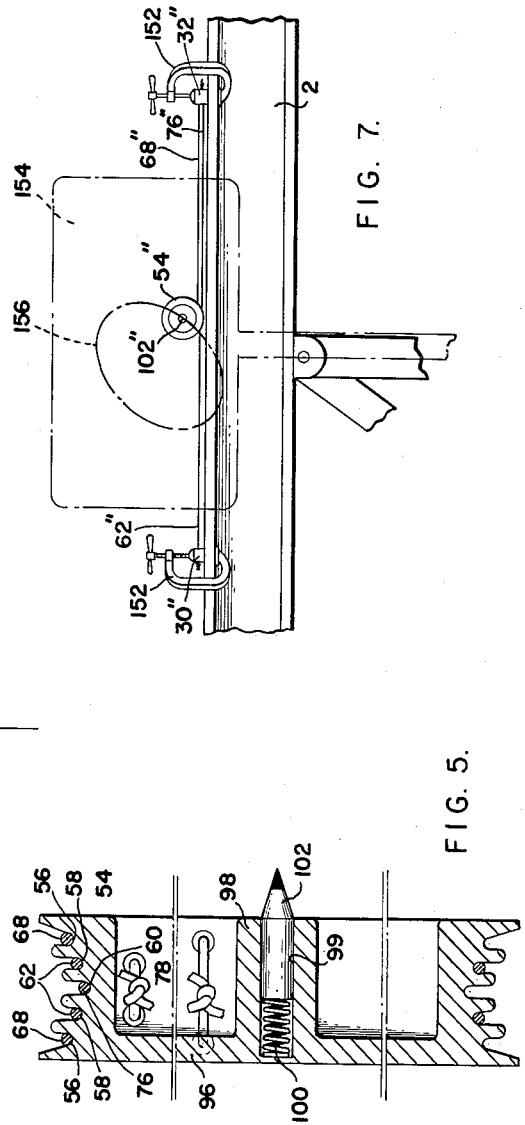
FIGURE 7 illustrates the use of the invention in measuring the strain on the walking beam.

With reference to FIGURE 7, there is shown a modification of the invention according to which strain of the walking beam 2 is measured and magnified to provide indications of load characteristics. In FIGURE 7 the reference numerals, which are double primed ("), identify structural elements which are identical with corresponding reference numerals in FIGURES 3 and 4. The bars 30" and 32" are secured to the beam 2 by clamps 152. Thus the strain of beam 2 will be greatly multiplied by movement of spool 54" and the path of a pencil 102" may be inscribed on a clipboard such as at 154. A diagram represented by, but not necessarily resembling, the line 156 may be compared with a previously recorded diagram. In the application of the invention as shown in FIGURE 7. A spring (not shown), similar to springs 86 and 86' is provided merely to maintain tautness of wires 62" and 68", and plays virtually no part in weighing of the load as in previous illustrations.

By the provision of suitable bracketing the principles of the invention may be applied to the determination of load characteristics in a single cable rather than in two as presently described. It will be seen from the above description that the invention constitutes a very simple yet accurate means for checking the load characteristics of oil well pumps in the field. Due to its simplicity the invention may be very cheaply produced and can be placed on the pumps permanently if desired. It will be understood that, consistent with the underlying principles explained herein, various departures from the specifically disclosed structure may be employed without departing from the scope of the invention as defined by the following claims.

What is claimed is:

1. A dynamometer comprising a multi-sectioned spool having a first circumference of one diameter and a second circumference of a different diameter, a pair of ropelike flexible members, one of said members passing around one of said circumferences and the other member passing around the other of said circumferences, each of said members being anchored at one point to its associated circumference of the spool, and means connecting said members to force transmitting means between two points thereof relatively movable in accordance with load variations, said connecting means comprising means for connecting one point of each of said members remote from said anchoring points to the transmitting means at one of the said relatively movable points thereof.

2. A dynamometer according to claim 1, including spring means connected between said relatively movable points and resisting relative movement thereof in one direction.

3. A dynamometer according to claim 2, including spring means connected between said spool and one of said relatively movable points resisting movement of said spool bodily in one direction.

4. A dynamometer comprising a multi-sectioned spool having three circumferences of relatively small, intermediate and large diameters, respectively, a ropelike flexible member anchored at one point to the spool and passing around said intermediate circumference and extending therefrom tangentially, second and third ropelike flexible members each anchored at a point to the spool, said second and third members passing around said small and large circumferences, respectively, and extending therefrom tangentially in a direction opposite to that of the first-mentioned member, a pair of elements connectible to force transmitting means at spaced points thereof relatively movable in accordance with load variations, said first-mentioned member being connected to one of said elements and said third member being connected to the other of said elements, spring means connecting the second member to said other element, said spring resisting movement of the second member in the direction of said first element.

5. A dynamometer comprising a pair of elements connectible to force transmitting means at two points thereof relatively movable in accordance with load variations, a multi-sectioned spool having at least two different peripheries of different diameters, a ropelike flexible member anchored at one point to one of said elements and thence passing to and around one of the said peripheries to a point where it is anchored to the spool, and a second ropelike flexible member anchored at a point to the other of said elements and thence passing to and around the other of said peripheries to a point where it is anchored to the spool.

6. A dynamometer according to claim 5, including spring means acting on said spool to maintain tautness of said members.

7. A dynamometer comprising a pair of elements connectible to force transmitting means at two points thereof relatively movable in accordance with load variations, a multi-sectioned spool having at least two different peripheries one of which has a larger diameter than the other, a ropelike flexible member anchored at one point to one of said elements and thence passing to and around said larger periphery to a point where it is anchored to the spool, a second ropelike flexible member anchored at a point to the other of said elements and thence passing to and around the other of said peripheries to a point where it is anchored to the spool, said spool being located between said elements.

8. A dynamometer according to claim 7, including spring means connected between said spool and one of said elements and acting to resist movement of the spool bodily toward said other element.

9. A dynamometer according to claim 7, including spring means and means connecting the spring means between said elements to resist relative movement thereof away from each other.

10. In combination with a walking beam pump having a pair of cable portions connecting the beam to a polish rod, a dynamometer comprising a pair of elements and means connecting each of said elements to one of said cable portions, a multi-sectioned spool having at least two different peripheries, one of said peripheries having a diameter greater than the other of said peripheries, a ropelike flexible member anchored at a point to one of said elements and thence passing to and around the larger of said peripheries in a given direction to a point where it is anchored to the spool, a second ropelike flexible member anchored at a point to the other of said elements and thence passing to and around the other of said peripheries in a direction opposite to the first direction to a point where it is anchored to the spool, spring means, and means connecting the spring means between said elements and urging the same toward each other to effect deflection of said cable portions.

11. A dynamometer comprising a circular element having two different coaxial surfaces of different diameters, a pair of elongated members, one of said members being tangentially engageable with one of said surfaces and the other of said members being tangentially engageable with the other said surface to produce rolling movement of said circular element in conjunction with axial movement of said members, and means connecting said members to force transmitting means between two points thereof relatively movable in accordance with load changes, said connecting means comprising means for connecting one end of each of said members to the transmitting means at one of said points.

References Cited in the file of this patent

UNITED STATES PATENTS

| | | |
|---|---|---|
| 2,376,037 | Davies et al. | May 15, 1945 |
| 2,767,578 | Scarth | Oct. 23, 1956 |